United States Patent [19]

Erickson et al.

[11] 4,021,711
[45] May 3, 1977

[54] ARTICLE POSITIONER WITH ZERO POSITION SENSING MEANS

[75] Inventors: John Joseph Erickson, Kingston; Harold Lester Leland, Hyde Park; Einar Skau Mathisen, Poughkeepsie, all of N.Y.

[73] Assignee: International Business Machines Corporation, Armonk, N.Y.

[22] Filed: June 27, 1975

[21] Appl. No.: 590,774

[52] U.S. Cl. .............................................. 318/480
[51] Int. Cl.$^2$ .......................................... H02H 3/00
[58] Field of Search .......... 318/640, 480; 250/491, 250/201

[56] References Cited

UNITED STATES PATENTS

| | | | |
|---|---|---|---|
| 3,484,666 | 12/1969 | Easton | 318/480 |
| 3,590,356 | 6/1971 | Hofmeister | 318/640 |
| 3,643,018 | 2/1972 | Adler | 250/201 |
| 3,708,681 | 1/1973 | Ivers | 250/231 R |
| 3,749,203 | 7/1973 | Hoelscher | 318/480 |
| 3,809,987 | 5/1974 | Suhr et al. | 318/640 |

*Primary Examiner*—Robert K. Schaefer
*Assistant Examiner*—John J. Feldhaus
*Attorney, Agent, or Firm*—D. R. McKechnie

[57] ABSTRACT

An article handler or positioner includes an X-Y table driven by reversible stepping motors. Zero position sensors function to provide an output signal when the X-Y table moves into a zero or home or reference position. The sensors are electro-optical devices having two beams of light one of which is gradually interrupted while the other one is gradually uninterrupted as the table moves into the zero position. Photo detectors provide output signals one of which increases and the other of which decreases as the table moves into the zero position and, at the point of crossover of the respective output signals, another output signal is generated indicating the home position is reached. This signal is then used to inhibit further operation of the driving motors.

6 Claims, 7 Drawing Figures

U.S. Patent  May 3, 1977  4,021,711
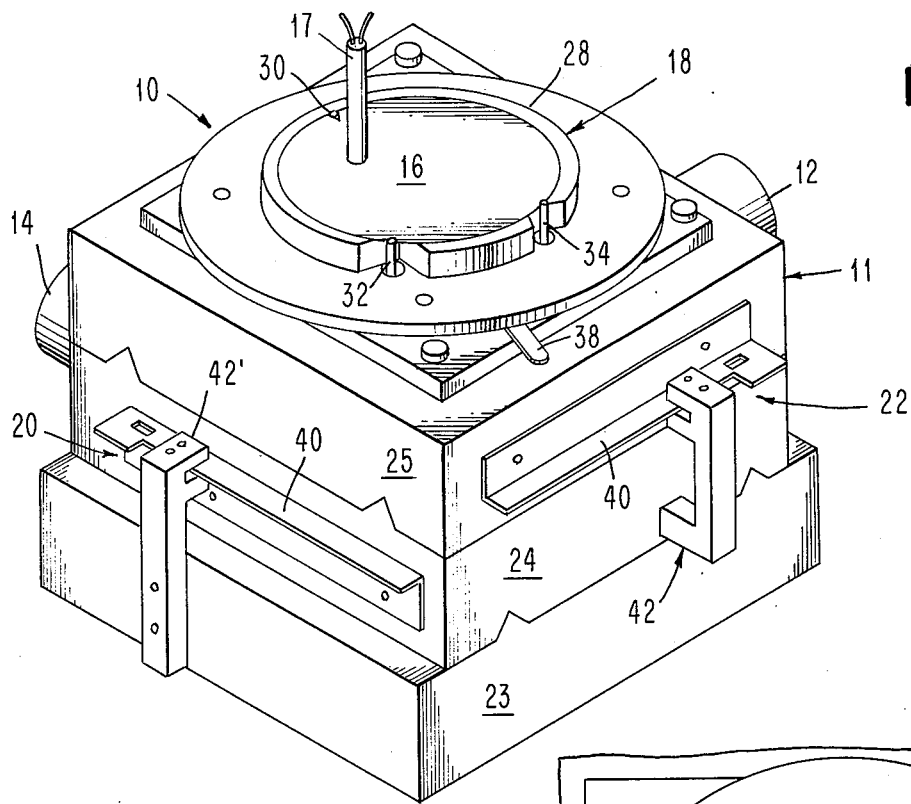
FIG. 1
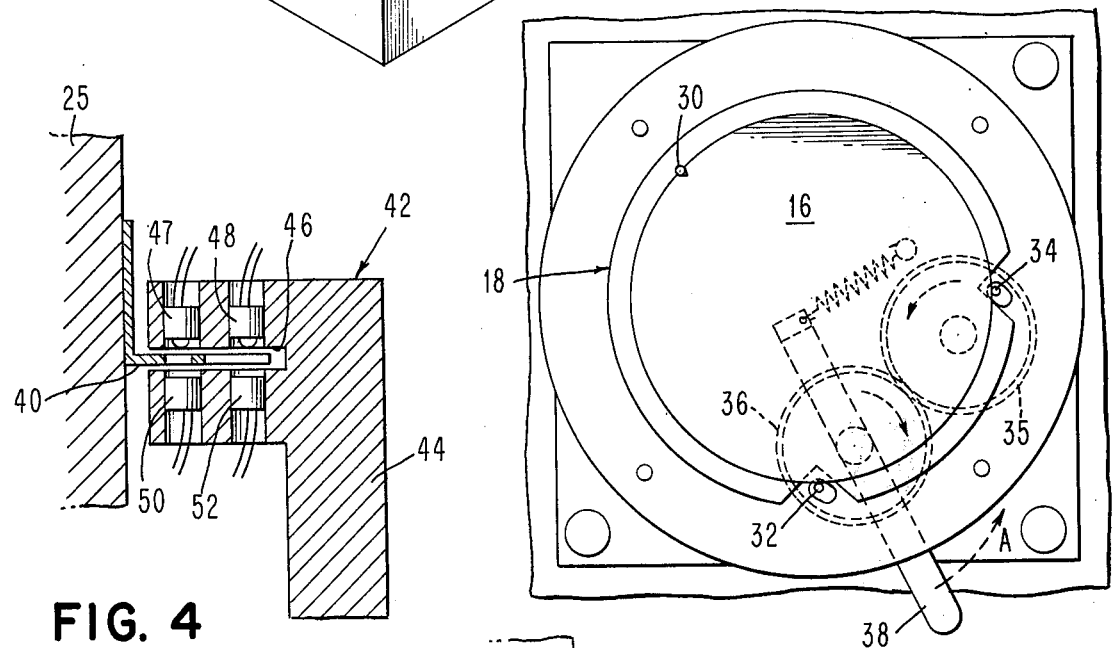
FIG. 2
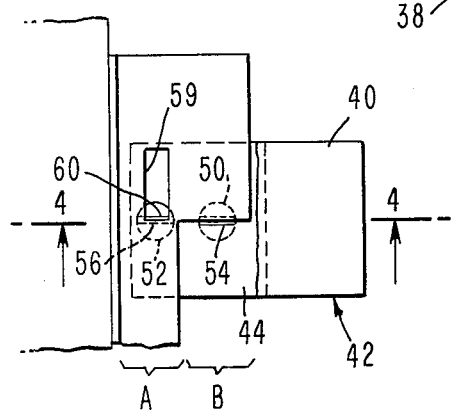
FIG. 4
FIG. 3

ARTICLE POSITIONER WITH ZERO POSITION SENSING MEANS

BACKGROUND OF THE INVENTION

1. Field of the Invention

This invention relates to article positioning systems and, more particularly, apparatus for establishing a zero or reference position for such systems.

2. Prior Art

Article positioning systems are known in which an article is supported by an X-Y table and is movable to predetermined positions under the control of some form of a controller or data processing system that provides the necessary commands and signals for controlling the movement of the X-Y table. The systems find use in many diverse applications, the most common being in connection with numerically controlled machine tools or with test apparatus for testing the article being handled. In most of these systems, some form of a zero or reference point is established. Movement of the table relative to the reference point is accomplished through the use of a servo mechanism that provides signals indicating how far the current position of the table is from either the reference point or the point to which it is desired to move the table. An example of the servo controlled positioner is disclosed in U.S. Pat. No. 3,209,222 — Holy. Another type of positioner that is known in the art is one which uses some form of a scale or graduation that is placed along the path of movement of the structure and is associated with some form of a detection system for reading the scales or graduations so that the position of the article from a reference position is known. An example of a system of this nature is disclosed in U.S. Pat. No. 3,372,321 — Seiuemon Inaba et al.

Also known under prior art are various forms of electro-optical detectors or sensing devices that are useful for detecting various conditions necessary for determining the relative conditions of two different objects. The above last mentioned patent shows one system in which electro-optical devices are used to read the graduations on scales. A somewhat similar electro optical device is also disclosed in U.S. Pat. No. 3,453,051 — Togino in which three photoelectric detectors are used to sense the scale gradations or markings.

SUMMARY OF THE INVENTION

One of the objects of the invention is to provide a simple, low-cost zero position sensing mechanism for use with an article handler having at least oe degree of linear movement.

Another object of the invention is to provide an article handling system with means to accurately establish a reference point so that the article can be moved relative to this reference point under program control by specifying the direction and extent of any further movement.

Still another object of the invention is to provide an X-Y handling mechanism with a zero position sensing apparatus.

A further object of the invention is to provide an article handling system having a reversible incremental drive arranged to move one member of the handling mechanism in a given direction until the zero position is reached and detected whereupon further incremental movement is inhibited.

Briefly, the invention comprises an article handler having at least two parts that are movable linearly relative to each other. A light interrupter plate is mounted on one part for movement therewith and an electro-optical detector is mounted on the other part. The detector includes two beams of light and the interrupter is shaped so that as the members move towards the zero or reference position, one beam is gradually interrupted or cut off while the other beam, which is normally cut off, is gradually increased. A pair of photo detectors are mounted in the paths of the light beams and provide electrical outputs proportional to the intensity. As the intensity of light in both beams increases and decreases respectively, the outputs of the photo detectors will pass through the same point and this crossover establishes the zero setting. A differential comparator circuit detects the crossover and provides an output that is used to inhibit further movement.

The foregoing and other objects, features and advantages of the invention will be apparent from the following more particular description of a preferred embodiment of the invention, as illustrated in the accompanying drawings wherein:

FIG. 1 is a perspective view of an article handler embodying the invention;

FIG. 2 is a top plan view of a portion of the apparatus shown in FIG. 1;

FIG. 3 is a top plan view, with portions removed, showing the relationship of the light interrupter plate to the electro-optical detector;

FIG. 4 is a cross-sectional view taken along line 4—4 of FIG. 3;

DETAILED DESCRIPTION

Figure 5:
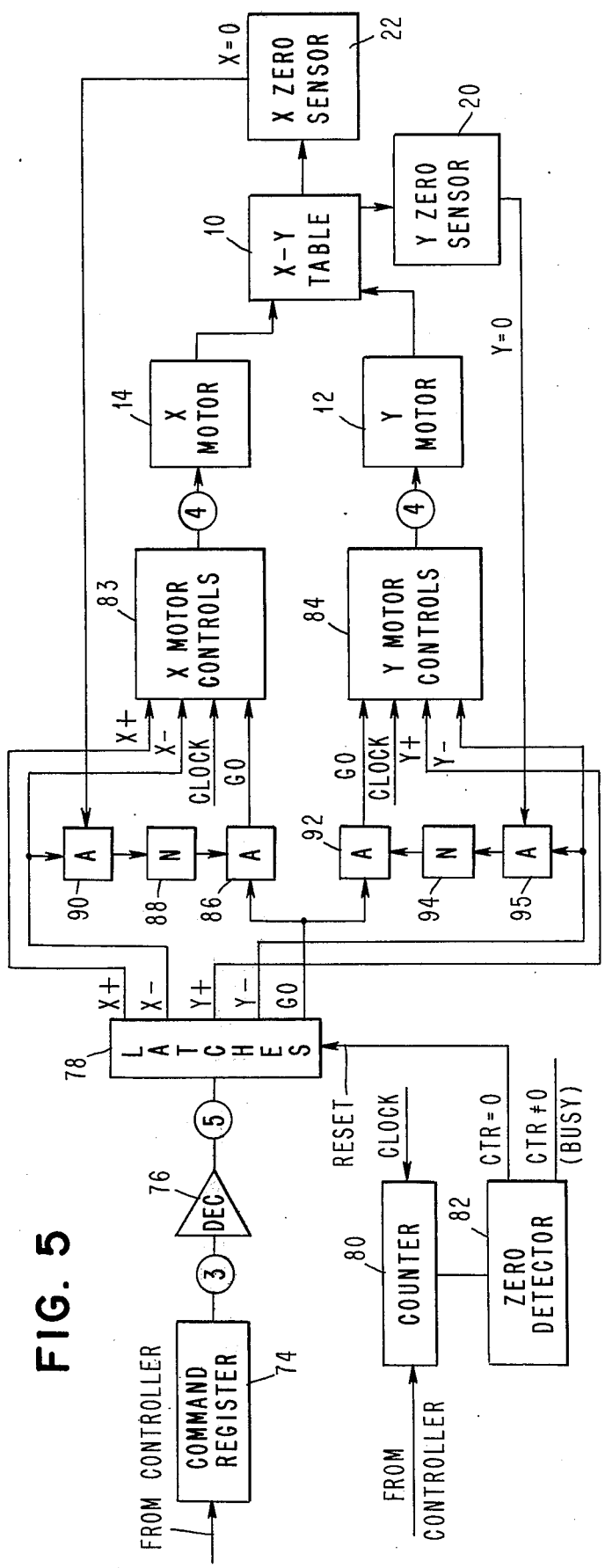
FIG. 5 is a schematic block diagram of the electrical control system.

Referring now to FIG. 1, an article handler 10 comprises an X-Y table 11 driven in two mutually perpendicular directions by a pair of reversible, digitally actuated stepping motors 12 and 14. The specific purpose of the article handler shown is to position a flat circular silicon wafer 16 of the type used to manufacture semiconductor devices, beneath a stationary fiber optic test probe 17. Wafer 16 is supported by a wafer holder 18 mounted on top of X-Y table 11. A pair of devices 20 and 22 are mounted on the table to sense, detect or define zero or reference positions, these devices being referred to hereafter simply as zero sensors. Each of these elements is described in more detail hereinafter.

Table 11 may be of any conventional commercially available X-Y table. As shown, it comprises a stationary base 23, a first member 24 mounted upon base 23 for movement in a first direction, and a second movable member 25 mounted upon member 24 for movement relative thereto at right angles to the direction of movement of member 24 relative to base 23. Member 24 is arbitrarily considered to be movable in the Y direction and therefore member 25 moves in the X direction. With such directions, then motor 14 is the Y motor, motor 12 is the X motor and sensors 20 and 22 are respectively Y and X zero sensors.

Wafer holder 18 comprises a plate assembly 28 mounted on top of member 25, the upper portion of assembly 18 supporting wafer 16. If desired, the upper portion may be provided with a multiplicity of holes connected to a vacuum source to aid in holding wafer 16 down. A fixed upstanding stud 30 engages a positioning notch in the edge of wafer 16 and cooperates with two relatively movable studs 32 and 34 for locating wafer in proper position atop holder 18. As shown in FIG. 2, studs 32 and 34 are mounted on intermeshed gears 35 and 36. A spring biased handle 38 is connected to gear 36 and is biased in a direction which tends to move studs 32 and 34 towards stud 30 and thereby clamp wafer 16 therebetween. Movement of handle 38 in the direction of dotted line A (FIG. 2) moves studs 32 and 34 outwardly and allows a wafer to be either removed or placed upon holder 18.

Each of the zero sensors is similar so that only one need be described in detail. X Zero sensor 22 comprises a metallic opaque interrupter plate 40 mounted on member 25 for movement therewith and an electro-optical assembly 42 mounted on member 24 for movement therewith. As shown in FIGS. 1 and 4, assembly 42 comprises a plastic housing 44 having a slot 46 therein of sufficient height and depth so as to allow plate 40, which is positioned therein, to freely move during movement of table 11. A pair of light emitting diodes 47 and 48 are mounted in bores in housing 44 above plate 40, the lower portions of the bores being open so that the diodes emit light downwardly. A pair of photo transistors 50 and 52 are mounted in housing 44 beneath diodes 47 and 48 to be responsive to light emitted therefrom. As shown in FIG. 3, housing 44 has two slots 54 and 56 immediately above phototransistors 50 and 52 to act as a mask for allowing only a portion of the light from diodes 47 and 48 to reach the photo transistors. Each of slots 54 and 56 has a width that extends in the direction of relative movement, which width is relatively large compared to the amount of movement that occurs with each increment of movement of the X-Y table. In the preferred embodiment, the X-Y table moves in increments of 1 mil and the width of slots 54 and 56 is 20 mils.

As best seen in FIG. 3, plate 40 is cut out to define a first edge 58 aligned with one edge 60 of a rectangular opening 59. Plate 40 can be considered to have two tracks A and B extending in the direction of movement, track A being a real, opaque track one end of which is bounded by edge 60 and track B being an imaginary or open track bounded by edge 58. Edges 58 and 60 will serve to define the zero position in a manner more fully pointed out hereafter and relative to this zero position, tracks A and B extend in the positive direction. Tracks A and B are aligned respectively with photo transistors 52 and 54 so that when plate 40 is in a positive position, track A blocks any light from diode 47 while track B allows light from diode 48 to be received by photo transistor 52.

Figure 6:
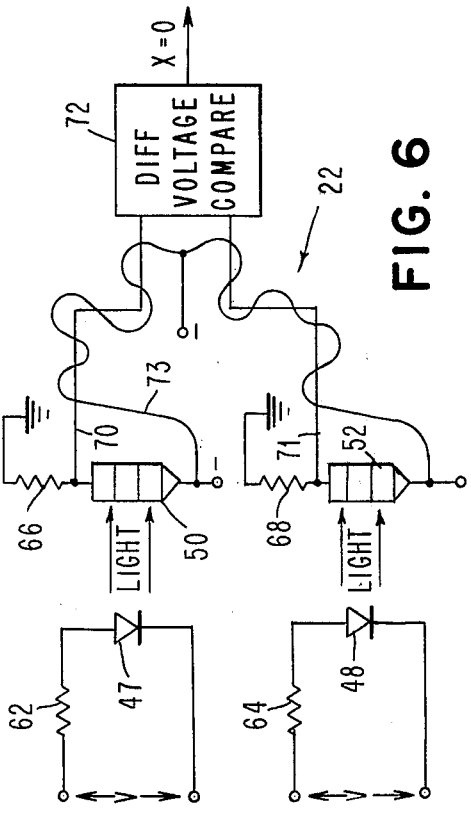
FIG. 6 is a schematic block diagram of the zero sensor circuits.

Referring now to FIG. 6, light emitting diodes 47 and 48 are connected through resistors 62 and 64 to a source of voltage V that continuously energizes the diodes so as to continuously emit light during operation of the article handler. Photo transistors 50 and 52 are connected through resistors 66 and 68 across a potential so that the amount of light from diodes 47 and 48 received by photo transistors 50 and 52 will vary the internal resistance thereof an amount proportional to the amount of light received. The collectors of transistors 50 and 52 are connected by lines 70 and 71 to the input of a conventional differential compare circuit 72 whose output is used to indicate that the zero position is reached. The manner in which this is done is described below. A twisted line 73 connected to the emitters of 50 and 52 and to ground reduces the noise level.

Figure 7:
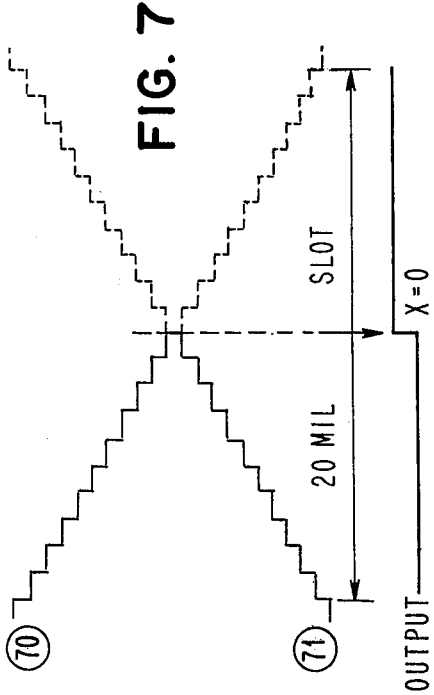
FIG. 7 is a graph of the outputs of the photo detectors indicating the zero reference position.

In order for the zero sensing device to be effective, the table must be positioned in a positive direction therefrom and move into the zero position in a negative direction. Before approaching the zero position, plate 40 is operative to cut off light directed towards transistor 50 while allowing light to reach transistor 52. Accordingly, the resistance of the former is relatively low while that of the latter is relatively high so as to produce an output voltage at the level shown at the left side of FIG. 7. As the table is incremented in the negative direction and moves towards the zero position, edge 58 begins to move across slot 54 thereby decreasing the amount of light that reaches transistor 50. Concurrently, edge 60 begins to move across slot 56 to thereby incrementally increase the amount of light reaching transistor 52. The resultant incremental changes in the outputs of transistors 50 and 52 causes the output voltages to decrease and increase as shown in FIG. 7 until a point is reached at which the voltages cross over one another. At this point, the voltage compare circuit 72 output switches to provide a voltage indicating that a zero position has been reached. As described below, further incremental movement in the X direction is thereafter inhibited so that the dotted line voltages on the right hand side of FIG. 7 are those that would occur if there was no inhibiting of further motion. The effect is that while the slot is of a 20 mil width and the increments of movement are one mil, the sensitivity of the voltage compare circuit is such as to be able to detect the voltage crossover within an accuracy of plus or minus one mil. While the foregoing description has been specific to X sensor 22, Y zero sensor 20 is nearly identical and works in a similar fashion, the sensor 20 including an interrupter plate 40 and an electro-optical housing 42'. The only difference between the two is in the shape of the lower part of 42' by means of which it is attached to base 23.

It is to be appreciated that sensors 20 and 22 are mounted on X-Y table 10 so as to provide a zero reference point at a location wherein all points of wafer 16 lie within the positive area. In addition, to prevent damage to the tables, suitable limit switches (not shown) may be provided. Two limit switches would be located in the minus direction and would be operative only in the event a malfunction failed to stop motion of the table as it comes into the zero position.

Referring now to FIG. 5, it is intended that the article handler of the invention be operated under the program control of some form of a conventional controller or data processing system to which it is connected. This controller would furnish the various commands for operation of the article handler and would furnish data telling how far and in which direction the article is to be moved. Thus, as shown, a command register 74 is connected to receive encoded commands from a conventional controller. These commands for operation of the article handler are simply to move the article in both positive and negative X direction, both positive and negative y direction and a GO command to initiate such movement. With five such commands, there are three lines coming out of command register 74 that are fed as an input to a decoder 76 providing five outputs for setting five different latches 78 in accordance with the particular command. A step down counter 80 is also connected to receive an input from the controller which input specifies how far the X-Y table is to be incremented, i.e., how many mils the article is to be moved. In the operation of the system, the controller would first send a command to register 74 and data, specifying the extent to which the table is to be moved, to counter 80. Then, a GO command is sent from the controller to initiate the actual movement. The movement occurs under clocking control. For each clock pulse, one increment of movement is produced and counter 80 is decremented by one. A zero detector 82 is connected to counter 80 to provide an output signal CTR = 0 when the counter is decremented to zero and this signal is used to reset latches 78. The zero detector may also provide a counter-not-equal-to-zero signal which can be used as a "busy" indicator to allow synchronization of the operation of the article handler with the controller.

X and Y motor controls 83 and 84 are connected to provide the actual signals for operation of motors 12 and 14. These motor controls are conventional and would be of the type necessary for operation of the motors. The inputs to the motor control circuits would be those specifying which direction movement is to occur in, a clocking signal and a GO signal to initiate the actual movement.

An AND circuit 86 controls operation of motor controls 83, and hence movement of table 10 in the X direction by passing on the GO signal from latches 78 when the table is positioned in a positive direction from the zero position while inhibiting passing on the GO signal when the X = 0 signal is received. To accomplish this, the output of the zero sensor 22 in which the X = 0 signal is provided, is fed to an AND circuit 90 which receives as another input a signal indicating movement in the negative direction. Thus, AND circuit 90 and the X zero sensor 22 is operative only when the table is moving in the negative direction. The output of AND circuit 90 is fed to an invert circuit 88 whose output is connected to AND circuit 86. In a similar fashion, the operation of motor controls 84 is controlled by an AND circuit 92 that receives as inputs a GO signal from latches 78 and an inverted signal from inverter 94 fed by AND circuit 95. Operation is inhibited when movement of the table is in the negative Y direction and the Y = 0 signal is generated.

In the overall operation of this system, the table is first moved to a positive position. Then, it is moved far enough in the negative direction to insure that the zero sensor circuits are actuated. Once the zero position is thereby established, further commands can be issued by the controller causing the article handler to move the wafer in any pre-programmed desired manner.

While the invention has been particularly shown and described with reference to preferred embodiment thereof, it will be understood by those skilled in the art that various changes in form and details may be made therein without departing from the spirit and scope of the invention.

What is claimed is:

1. In an article handling system comprising an X-Y table for supporting and moving the article, selectively actuated reversible X and Y stepping motors for moving said table in small increments to position the article in only one lineal direction along X and Y axes relative to zero positions on said axes, and motor control means responsive to digital control command signals including ones specifying the direction and extent of incrementing movement, to clock signals and to a GO signal, said table comprising a stationary first member, a second member mounted on said first member for movement along said X axis, and a third member mounted on said second member for movement along said Y axis, the improvement comprising the combination of:

X and Y zero position sensing means for detecting and defining said zero positions on said X and Y axis, each of said sensing means comprising an opaque plate mounted on one of said members and having a first track including a first edge adjacent a cutout extending in one direction of movement and a second track including a second edge adjacent an opaque portion extending in said one direction of movement, said first and second edges extending perpendicularly to said one direction of movement, light source means mounted on another of said members on one side of said opaque plate, first and second light detectors mounted on said another of said members on the other side of said plate and providing output signals proportional to the amount of light received thereby, said detectors being respectively aligned with said first and second tracks, whereby relative movement between said one and another of said members produces a relative movement between said plate and said light source means and said detectors, said plate, light source means and detectors being located to establish a zero position whereby the output of one detector increases while the output of the other detector decreases due to movement of said first and second edges between said light source means and said detectors, and first circuit means connected to said detectors for comparing said output signals and providing a zero position signal when said output signals have a predetermined ratio;

a command register for receiving digital command signals defining the direction and extent of movement, said command register being connected to said motor control means to supply said command signals thereto whereby said motors are actuated solely in response to said command signals and to said GO signal;

and second circuit means connected to said first circuit means and being operative to inhibit actuation of said motors in response to said zero position signal, to thereby position said table in said zero positions.

2. The combination of claim 1 wherein said second circuit means is operative to inhibit actuation of said motors only when the relative movement between said members is in a predetermined direction.

3. The combination of claim 1 wherein each sensing means further comprises a housing, said light source means and said detectors being mounted in said housing, said housing having a slot therein through which said plate extends.

4. The combination of claim 3 wherein:

said detectors comprise phototransistors,
    and said housing has slots between said phototransistors and said light source means through which slots light from said light source means passes to said phototransistors, said slots extending parallel to said edges.

5. The combination of claim 4 wherein:

said circuit means includes a differential comparator operative to compare output signals from said phototransistors.

6. The combination of claim 5 wherein:

said light source means comprises two light emitting diodes mounting in alignment with said phototransistors.

* * * * *